United States Patent [19]
Koppers et al.

[11] 4,437,562
[45] Mar. 20, 1984

[54] CHAIN BUCKET CONVEYOR

[75] Inventors: Manfred Koppers, Duisburg; Karlheinz Bohnes, Bochum; Heinz Kunzer, Herne, all of Fed. Rep. of Germany

[73] Assignee: Bochumer Eisenhütte GmbH & Co. KG, Bochum, Fed. Rep. of Germany

[21] Appl. No.: 320,716

[22] Filed: Nov. 12, 1981

[30] Foreign Application Priority Data

Nov. 18, 1980 [DE] Fed. Rep. of Germany ....... 3043431

[51] Int. Cl.³ .............................................. B65G 19/08
[52] U.S. Cl. .................................. 198/733; 198/735; 198/839
[58] Field of Search ............... 198/732, 733, 735, 716, 198/729, 839, 509, 520

[56] References Cited

U.S. PATENT DOCUMENTS

| | | | |
|---|---|---|---|
| 1,821,438 | 9/1931 | Levin | 198/732 |
| 2,757,374 | 7/1956 | Reed | 198/729 |
| 2,793,737 | 5/1957 | Sandeman et al. | 198/732 |

FOREIGN PATENT DOCUMENTS 677459 6/1939 Fed. Rep. of Germany ...... 198/735

*Primary Examiner*—Joseph E. Valenza
*Assistant Examiner*—Jonathan D. Holmes
*Attorney, Agent, or Firm*—Michael J. Striker

[57] ABSTRACT

A chain bucket conveyor for an underground excavation has a substantially U-shaped forward conveyor part at the side of the sole and open toward a roof, a return conveyor part at the side of backfilling and closed in a substantially channel-like manner, wherein the return conveyor part is normal to the forward conveyor part, and means for transporting the chain from one to the other of the conveyor parts and including actuating stations, a rotary chain wheel having chain pockets and arranged at the actuating stations rotatable about an axis which extends toward the roof and backfilling and is located in a vertical plane transverse to the longitudinal direction of the conveyor, and a conical surface narrowing toward the roof and having an axis coinciding with the axis of rotation of the chain wheel.

17 Claims, 6 Drawing Figures

CHAIN BUCKET CONVEYOR

BACKGROUND OF THE INVENTION

The present invention relates to an intermediate chain bucket conveyor.

Conveyors of the above mentioned general type are known in the art. One such conveyor is disclosed, for example, in the German patent No. 2,038,616. This conveyor has a U-shaped forward conveyor part at the side of a sole and open toward the roof, and a return conveyor part at the side of backfilling and closed in a substantially channel-like manner, wherein the return conveyor part is normal to the forward conveyor part. An endless chain including a bucket chain member and a plurality of buckets mounted thereon move in the above mentioned conveyor parts. This conveyor has the advantage, as compared with the bucket conveyor with superimposed conveyor parts, that in the event of cessation of the return conveyor part located under the forward conveyor part, chain cracks no longer can take place which are particularly produced by small coal. It is thereby no longer necessary to lift the conveyor for elimination of these chain cracks. Furthermore, in such a conveyor no failures take place because of flamming under the conveyor, and contacts between the chain portion moving in the return conveyor part and the sole as a result of movement of the conveyor in the longitudinal direction of the transverse passage. A very important advantage of this conveyor is the fact that the energy dissipation by the return conveyor part at the sole side is reduced from approximately 50% to a considerable value. Moreover, since the forward conveyor part is arranged directly on the sole, the conveyor has a very small height, whereby the material removed from the mine face can be loaded onto the conveyor with considerably smaller expenditures. Finally, the vertically arranged and thereby easily accessible return conveyor part at the backfilling side forms a natural shield for driving and no additional means is necessary.

Despite the above described advantages, this conveyor has not been implemented in practice, inasmuch as it was not possible to solve the problems in the region of the drive and reverse stations for transporting the chain from one to the other conveyor part. These difficulties result from the fact that, at one end of the conveyor line, the chain with the central conveyor chain member must run, in the event of substantially vertical buckets, from the forward conveyor part in a substantially horizontal position into the forward conveyor part, and at the other end must again run from the horizontal position into the vertical position. Thereby, spatial turning of the buckets by 90° is required. Suitable drive and/or reverse stations which would be capable of spatial movement of the buckets of the chain have not been available.

In a bucket conveyor with two outer chains, a forward conveyor part located at the side of a sole, and a return conveyor part arranged normal thereto which is disclosed for example in the German patent No. 679,604 reversing of the chain is performed. This reversing is carried out with the aid of a complicated spatially curved chain channel which is provided at the junction on the chain wheel is conventionally rotatable about a horizontal axis. Since in this case both outer chains must cover paths of considerably different lengths, this necessarily leads to clamping and thereby disturbances of the mining operation. Furthermore, considerable wear cannot be avoided. Also, the construction expenditures are high, since the chain channel must be stabilized with the consideration of the not insignificant chain pulling forces.

A further problem with chain wheels rotatable about horizontal axes is that it is desirable to retain the outer diameter as small as possible in view of the entire height of a machine frame. This leads, as a rule, to the fact that the bucket chains travel from one to the other conveyor parts with a relatively great curvature. As a result of this, only a small number of chain links and particularly only horizontal chain links come into engagement with the respective buckets in the chain wheel. The great radius of curvature acts also in such a manner that the superimposed chain links are considerably inclined relative to one another, whereby they are subjected to high wear. This is further aggravated by the fact that only each second particularly horizontal chain link is embraced by the chain wheel in interengaging and force-transmitting manner and transmits the force in the bucket chain.

A so-called wing bucket conveyor with only one outer chain is disclosed in German patent No. 809,415. It employs a roller chain which runs over the respective guides always at an angle of 45° to the sole. Thereby a simple chain wheel for reversing the bucket chain is sufficient, whose axis of rotation with regard to its inclination must correspond to the inclined rotary position of the bucket chain. The bucket wings are pivotally connected by a folding mechanism with the bucket chain so that they can fold into the return conveyor part against the running direction downwardly.

SUMMARY OF THE INVENTION

Accordingly, it is an object of the present invention to provide a chain bucket conveyor which avoids the disadvantages of the prior art. More particularly, it is an object of the present invention to provide a chain bucket conveyor with drive and/or reversing stations which guarantees transportation of a chain from one conveyor part to another conveyor part without distortions and jamming.

In keeping with these objects, and with others which will become apparent hereinafter, one feature of the present invention resides, briefly stated, in a chain bucket conveyor with a substantially U-shaped forward conveyor part and a closed return conveyor part normal to the former, wherein a rotary chain wheel with chain pockets is arranged at each of the driving and/or reversing stations rotatable about an axis which ascends toward the roof and backfilling and is located in a vertical plane transverse to the longitudinal direction of the conveyor, and a conical surface is also provided narrowing toward the roof and having an axis coinciding with the axis of rotation of the chain wheel.

When the chain bucket conveyor is designed in accordance with the present invention, the buckets of the chain run now for example from the vertical conveyor part over the conical surface without deflecting in one or another direction or turning about one or another axis. The chain links of the bucket chain member also run without abutment or tilting in the chain pockets of the chain wheel. After running the buckets on the surface, they are then transported uniformly and without distortion in the horizontal forward position while lying on the surface. Because of the inclination of the surface and the chain wheel, the buckets are lifted during deflection first to a higher level from which they are then lowered by a respectively designed transition groove in the region of the drive and/or reverse stations to the level of the sole.

This also takes place without jamming and distortion. At the other end of the conveyor line, the buckets are lifted first in the opposite direction from the level of the sole via the transition groove, then travel onto the horizontally running surface and the chain wheel so that because of this they are turned to the vertical return position and run in the return conveyor part.

Because of the inclined position, the chain wheel can have a considerably greater diameter as compared with a horizontally rotatable chain wheel, without increasing the height of the conveyor with respect to the conventional machine frames. The radial increase of the chain wheel leads to a further advantage in the fact that more chain links can be brought into engagement. Thereby, the loading of each individual chain link is reduced. Also, because of the great radius, the successive chain links are no longer inclined to such a great extent. Thereby, the wear is decreased. Because of the larger chain wheel, a more quiet run of the chain over the drive and reverse stations takes place. As a result of this, the wear is again reduced.

Since it is possible now to use a chain wheel with a greater diameter, it is further possible to utilize a bucket chain member with a considerably greater pitch as compared with the conventional bucket chains. Thus, for example with a conveyor length of 200 meters, a weight economy of approximately 1.5 ton is obtained. Such a weight economy means a lower drive output. The installation for the conveyor drive can thereby be considerably smaller in the sense of requirements for the underground mine operations. Because of the greater chain pitch, a greater space is available between two successive chain links in the same plane. This makes it possible to mount the bucket on the bucket chain member in structurally advantageous manner, particularly in the sense of passing over the chain wheel.

In dependence upon the available stratum thickness, the angle of the axis of rotation of the chain wheel to the sole can amount to approximately 45° to 60°. In connection with this, it is recommended that the angle between the axis of the bucket wheel and the surface corresponds to this angle of inclination. In lower strata, a smaller angle is provided in order to keep the entire station as low as possible. In this case, the buckets running over the surface and from the latter are located not exactly normal to one another, as is the case with an angle of 45°. The required insignificant deflection can be dealt with without difficulties by a corresponding construction of transition grooves forming as a rule components of the drive and/or reverse stations. As a rule, compensation is provided in the return conveyor part, whereas the transition from the surface to the forward conveyor part, or vice versa, is carried out for example horizontally.

In accordance with an advantageous embodiment of the invention, the chain wheel and the surface form components of a rotary drum which rotates about an axis of the chain wheel. Thereby the buckets run so fine that no relative movement to the surface takes place.

In accordance with an embodiment which is especially advantageous, in the sense of drive and support advantages, the surface forms a fixed component of the drive and/or reverse stations, and the chain wheel is guided in a recess of the surface. In this case, the buckets slide on the position-invariable surface with synchronous pulling by the chain wheel.

Despite the fact that, because of the inventive construction of the chain wheel, a greater partial circuit for the running of the bucket chain member is formed which results in a considerably smaller wear, it is recommended that the chain pockets be provided in a pocket rim releasably mounted on the chain wheel. It can be exchanged without difficulties in a short time, if required.

A further advantageous feature of the present invention resides in the fact that each chain link of the bucket chain member engages in inclined position in a respectively shaped bucket pocket of the bucket wheel in shape-locking manner. Thereby, each chain link is now engaged in a driven manner and its specific loading is reduced. The service life of the bucket chain member is improved, and the danger of chain cracks during the mining work is reduced.

In accordance with a further feature of the present invention, the chain wheel is driven via a shaft end portion facing toward the sole, and moves with its end portion facing toward the roof in a gibbet of a drive station. This feature provides for a space-consuming arrangement of the conveyor drive, which is of particular importance in the condition of underground excavation, particularly in the transition region between galleries and transverse passages.

It should be mentioned that now the entire transmission can be integrated in the machine frame of the drive station and needs no longer be flanged laterally or at an end side thereof. This leads to an extremely light machine frame. In principle, the transmission housing can replace the machine frame. In order to provide for exchangeability of the wearing part of the drive station, a shell is for example mounted on the transmission housing and accommodates the wearing part. In this manner, the wearing part can be easily exchanged when required. With the integration of the transmission in the drive station, a further advantage is provided in the fact that the extensive space consumption is reduced. The narrow space in the region of a drive and/or reverse station can be better utilized for improvement purposes.

The invention provides for a further advantage when at both sides of the conical surface guiding rims are provided for ends of the buckets. These guiding rims are especially effective when the free ends of the buckets are foldable relative to the central part connected with the bucket chain member. In this case the guiding rims act so that they fold the bucket ends before running in the return conveyor part in direction to the bucket chain member, and after passing the return conveyor part the buckets are again unfolded in the longitudinal direction.

This makes possible with the conventional conveyor widths of approximately 600 mm, to arrange the vertical return conveyor part very low, since the buckets can run back with folded ends. In connection with the forward conveyor part arranged directly on the sole, the conveyor is particularly suitable for small stratum thicknesses.

In accordance with the invention, the ends of the buckets can be folded in the vertical longitudinal plane of the bucket. Thereby, the bucket ends can be connected very stable with the central part in order to utilize the conveyor in both transport directions.

The bucket ends can attain well defined end positions both in the forward conveyor part and the return conveyor part when, in accordance with a further feature of the present invention, the swinging movement of the bucket ends is limited. This can be performed, for example, by cam-like projections projecting in the movement direction of the chain.

Finally, in accordance with still a further feature of the present invention, the buckets are formed bridge-shaped. In this case, the bucket chain member can be retained non-divided, and each bucket can be exchanged in condition of the closed chain, when required.

The novel features which are considered characteristic for the invention are set forth in particular in the appended claims. The invention itself, however, both as to its construction and its method of operation, will be best understood from the following description of specific embodiments when read in connection with the accompanying drawing.

DESCRIPTION OF THE PREFERRED EMBODIMENTS

Figure 1:
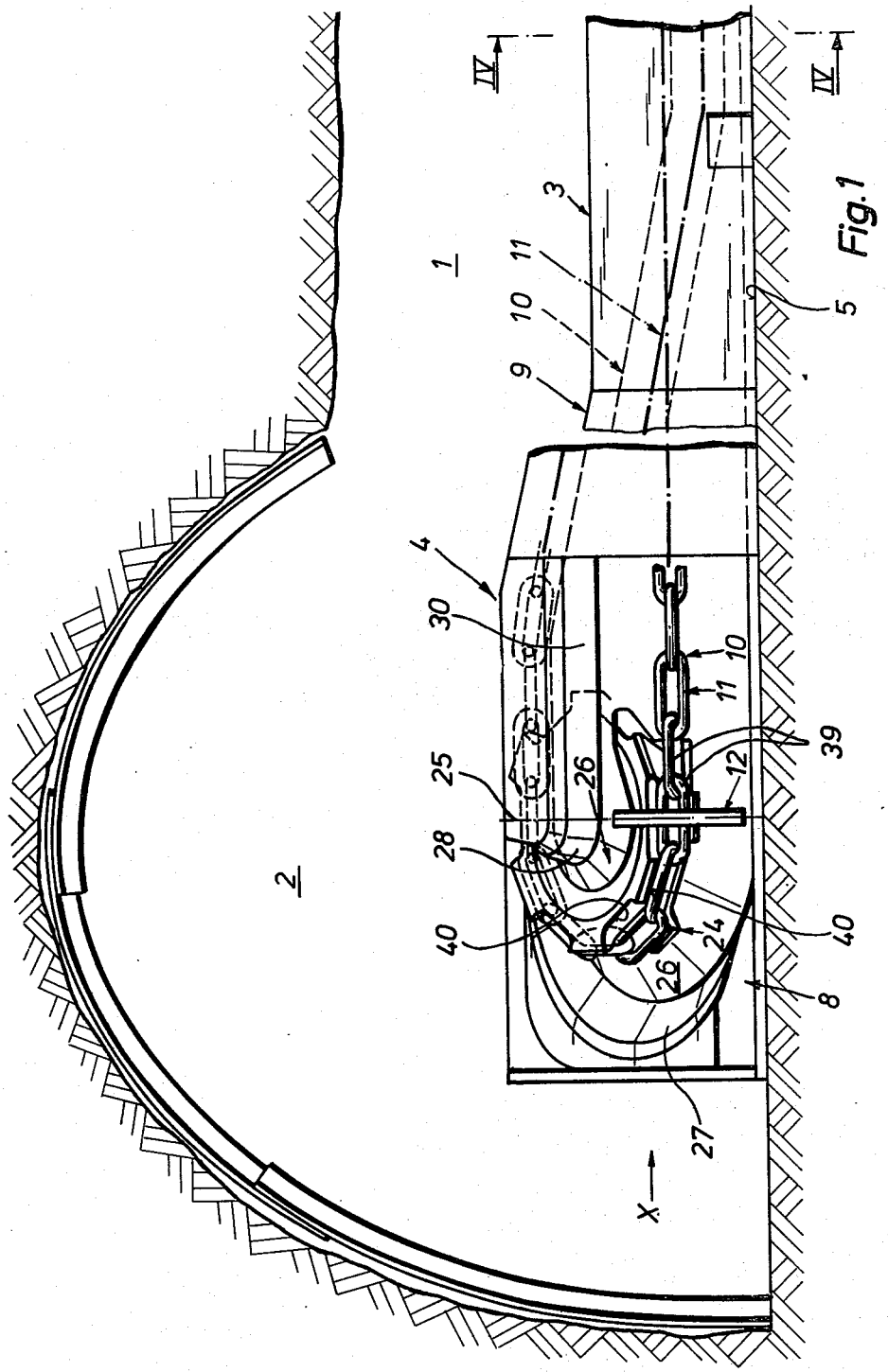
FIG. 1 is a view showing a vertical section of a transition region between a gallery and a passage with a drive station of a conveyor.

A chain bucket conveyor in accordance with the present invention is shown as utilized for an underground excavation with a gallery 2 and a passage 1 extending transverse to the latter. A central chain bucket conveyor is identified by reference numeral 3 and moves in the passage 1 along the longwall face. Its drive station 4 extends to the gallery 2 and anchored there in a not shown manner.

Figure 4:
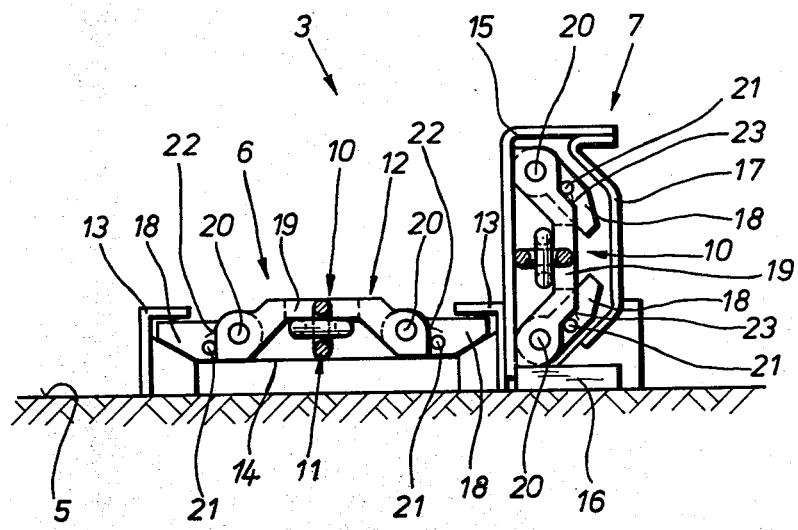
FIG. 4 is a view showing a vertical section of the conveyor taken along the line IV—IV in FIG. 1.

As can be seen from joint consideration of FIGS. 1 and 4, the conveyor 3 has a forward conveyor part 6 which is arranged on a sole 5, is U-shaped and upwardly open. The conveyor 3 further includes a return conveyor part 7 which is closed in channel-like manner, arranged at the backfilling side, and normal to the forward conveyor part 6. The forward conveyor part 6 and the return conveyor part 7 are united in running direction to a structural unit and articulately connected by a non-illustrated coupling element with runs adjacent in the longitudinal direction of the conveyor.

The conveyor extends over the entire length of the passage and has at a not shown other end a drive and/or reverse station 4 which will be described below.

The drive station 4 has a machine frame 8 which is coupled, with interposition of a transition channel member 9, with the conveyor runs moving in the passage 1. As can be seen particularly from FIG. 1 and FIG. 4, a chain 10 runs in the conveyor parts 6 and 7 of the conveyor 3. The chain 10 includes a round link bucket chain member 11 and a plurality of buckets 12 arranged on the latter at predetermined distances from one another.

For guiding the chain 10, the forward conveyor part 6 includes two lateral groove-shaped members 13 and a conveyor bottom 14, whereas the return conveyor part 7 has an angular member 15, a sole member 16, and a detachable rear wall 17. The buckets 12 are bridge-shaped. Their ends 18 are foldable relative to a central part 19 releasably mounted on the chain member 11, about a pivot axis 20 extending in the longitudinal direction of the passage 1, in the longitudinal plane of the buckets 12. The bucket ends 18 have swinging limiting means formed by cam-shaped projections 21 which project in the direction of movement of the chain 10. The projections 21 extend in both positions in the forward conveyor part 6 and the rearward conveyor part 7 on end sides 22 of the intermediate part 19 at its back faces 23, respectively.

Figure 2:
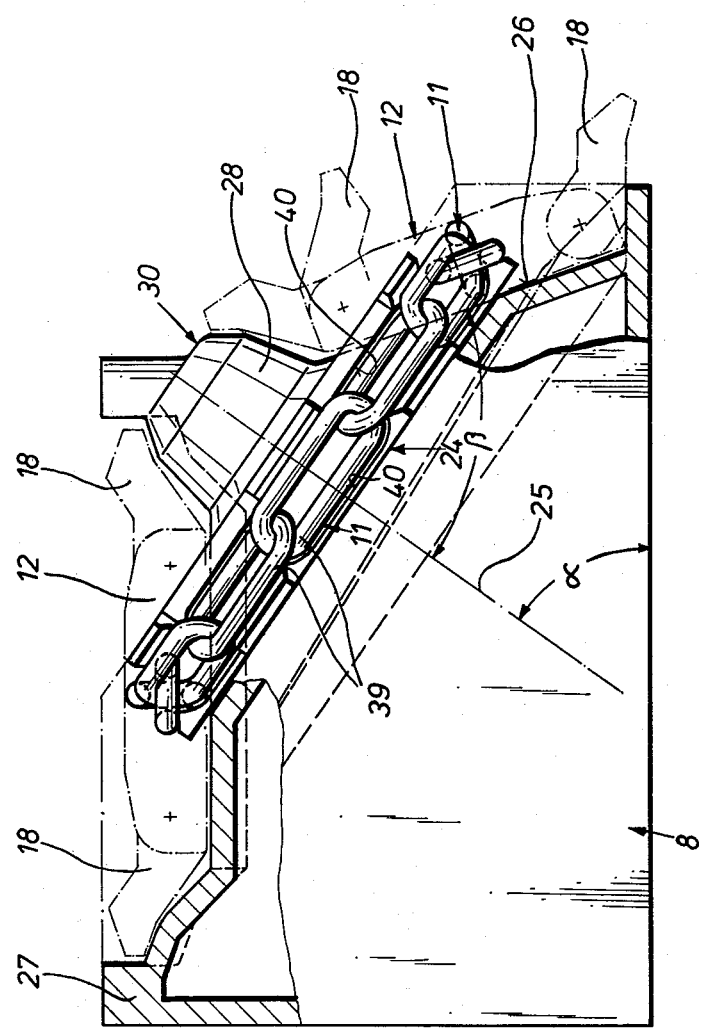
FIG. 2 is an enlarged view taken in a direction identified by the arrow X in FIG. 1.
Figure 3:
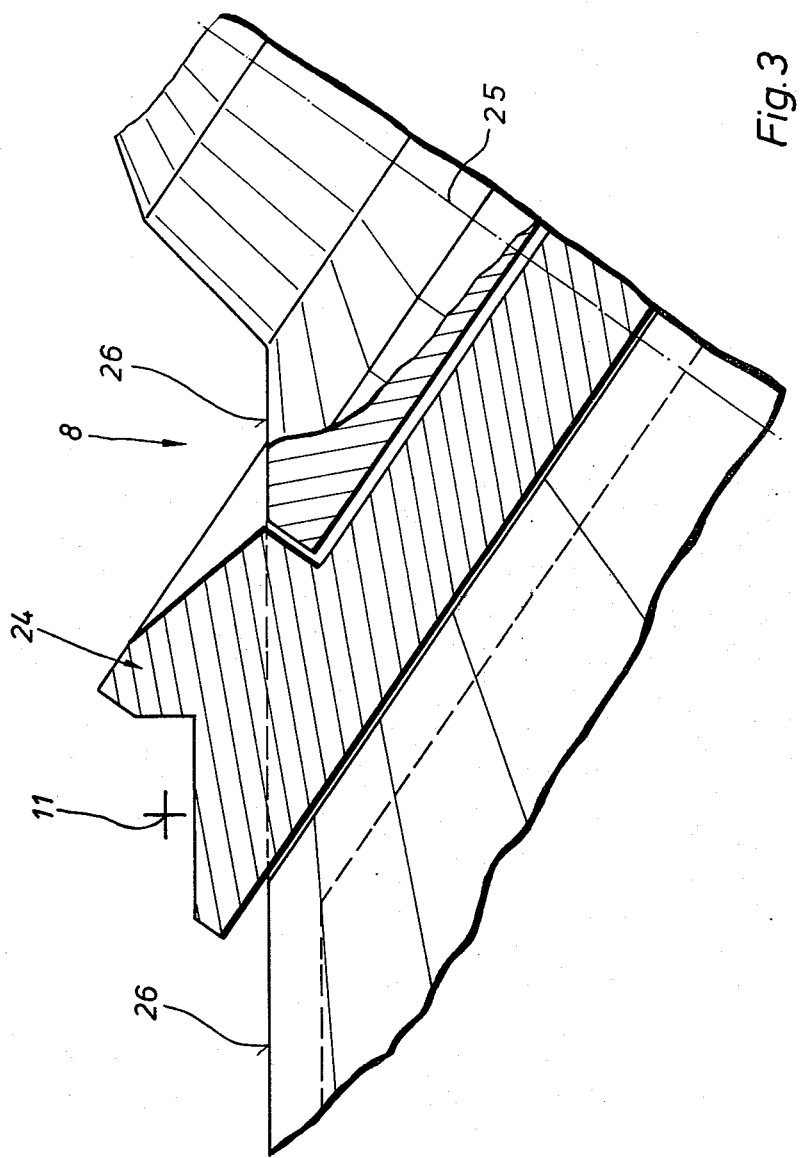
FIG. 3 is a view showing a section taken in FIG. 2 in the region of a chain wheel, partially in plan view and partially in section.

For turning the buckets 12 passing the rearward conveyor part 7 to the horizontal position in the forward conveyor part 6, a chain wheel 24 is arranged inclined in the drive station 4, as can be seen from FIGS. 1 and 3. The chain wheel 24 has an axis 25 which is directed toward the backfilling and the roof and extends in a vertical transverse plane of the conveyor 3. The pivot axis 25 is inclined at an angle $\alpha$ equal to 55° to the sole 5. The chain wheel 24, as can be seen from joint consideration of FIGS. 1 and 3, is limited from above and from below by a conical surface 26. The cone of the surface 26 reduces in direction toward the roof. The angle $\beta$ between the surface 26 and the pivot axis 25 of the chain wheel 24 amounts in the shown example to 35°. Because of this, the buckets 12 run out of the return conveyor part 7 uniformly and without distortion to another height level, and pass to the horizontal position as can be seen particularly from FIG. 2. Because of the selective inclination of the pivot axis 25 and the angle $\beta$ of the inclination of the surface 26, it is necessary for transitionless running of the buckets 12 on the surface 26 that the return conveyor part 7 in the region of the transition groove element 9 be inclined from the vertical position of FIG. 4 to the inclined position of FIG. 2 by approximately 20°. Further, it is required in the region of the transition groove member 9 to provide an inclined track in order to lower the buckets 12 moving from the chain wheel 24 on the high level to the sole side forward conveyor part 6, as can be seen in FIG. 1.

FIGS. 1 and 2 further show that both sides of the conical surface 26 are provided with guiding rims 27 and 28 for the bucket ends 18. The guiding rims 27 and 25 act at each conveyor end for holding the bucket ends 18 during transition from the forward conveyor part 6 to the rearward conveyor part 7 and at another conveyor end for unfolding the same during transition from the rearward conveyor part 7 to the forward conveyor part 6.

Figure 5:
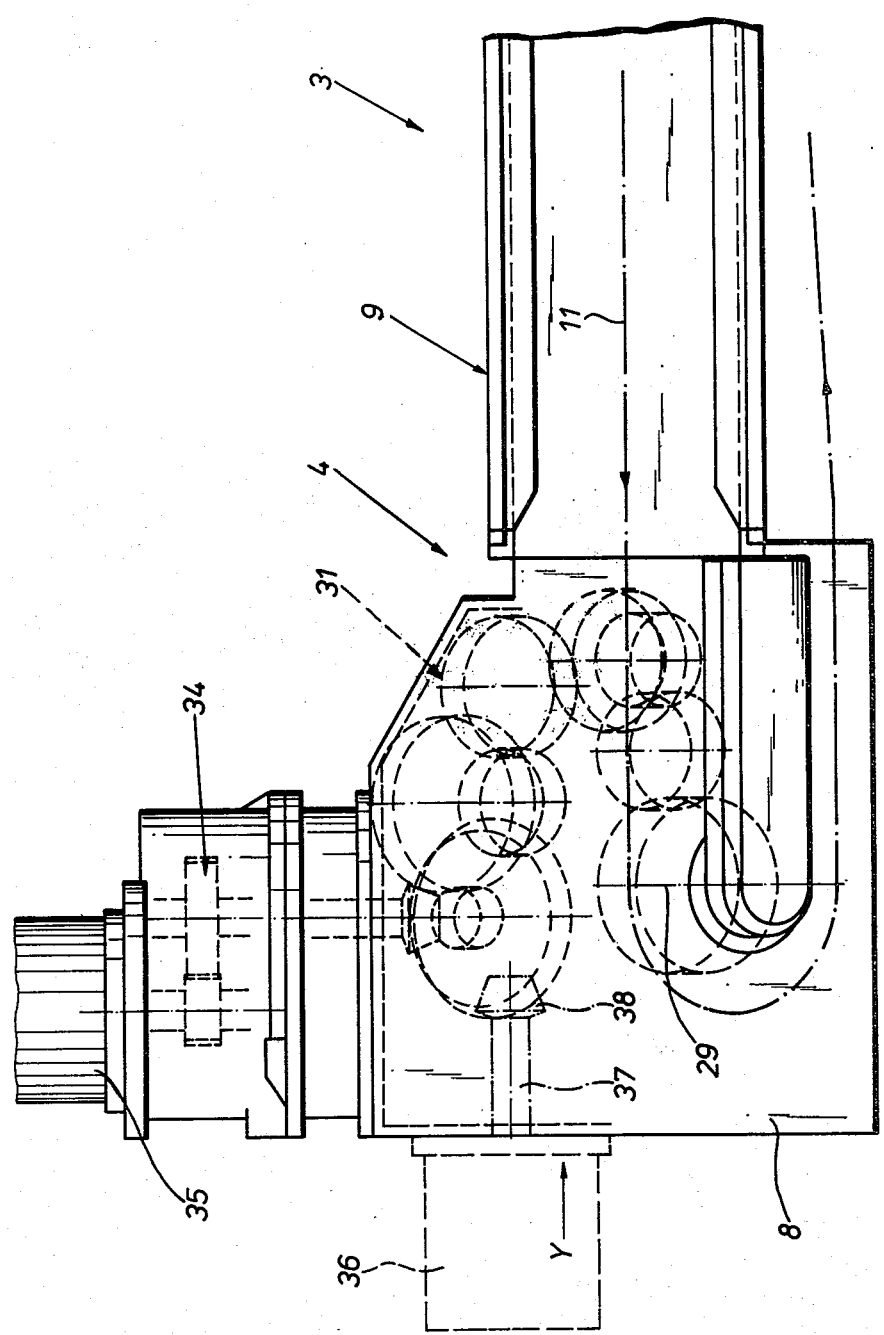
FIG. 5 is an enlarged plan view of the drive station of FIG. 1.
Figure 6:
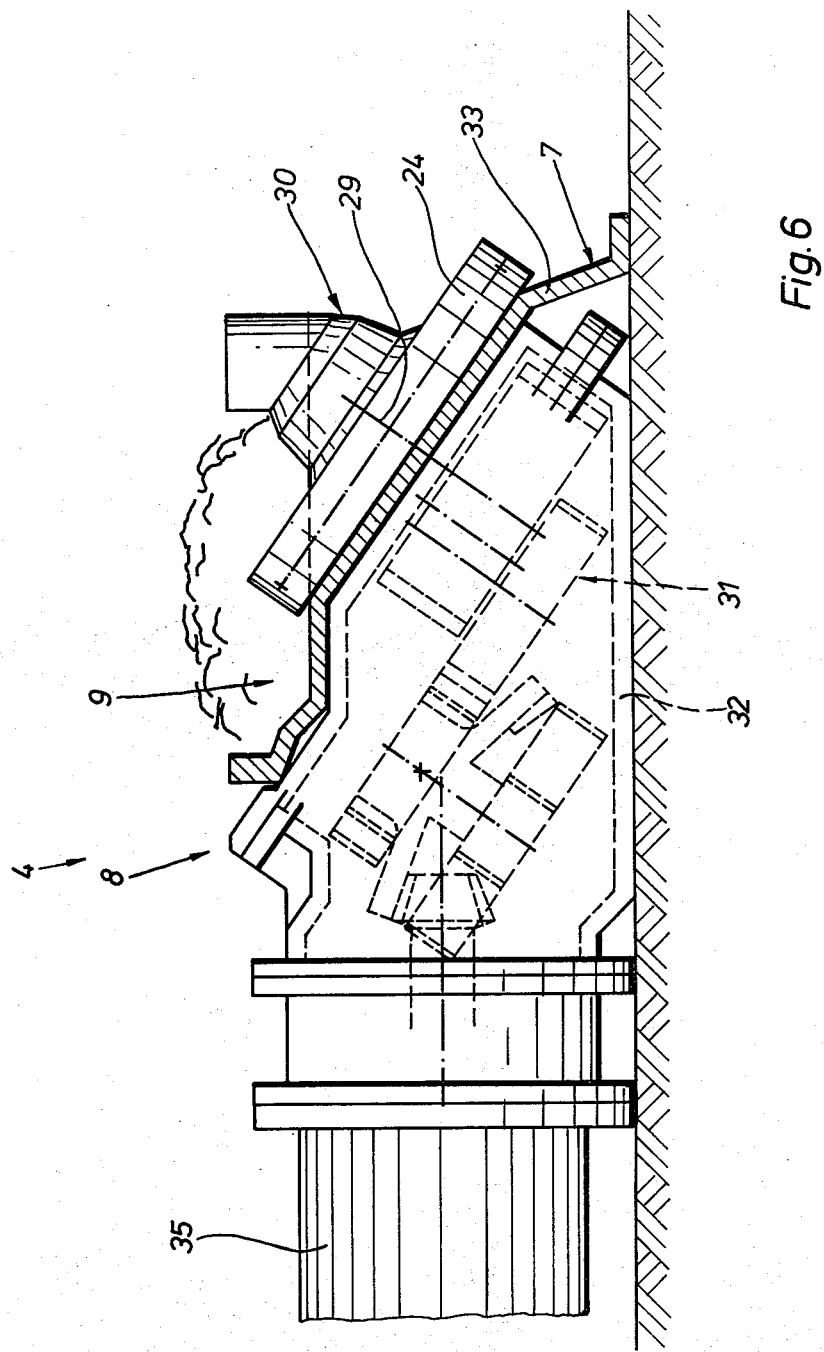
FIG. 6 is an end view in direction of the arrow Y in FIG. 5.

The chain wheel 24 is arranged on a chain wheel shaft 29 shown in FIG. 6. The shaft 29 at its upper end moves in a gibbet 30 of the machine frame 8, carrying the guide rim 28. The lower end of the shaft 29 is connected with a transmission 31 shown in FIGS. 5 and 6. The transmission 31 is arranged in a single housing 32 which is integrated in the drive station 4. The wearing part of the machine frame 8 which serve for guiding the buckets 12 are formed, as shown in FIG. 5, as a shell 33 detachably connected with the transmission housing 32. A supplementary transmission is identified by reference numeral 35, and a drive motor 34 is flanged on the same normal to the longitudinal direction of the conveyor.

FIG. 5 shows additionally an embodiment in which a drive motor 36 is flanged on the machine frame 8 in longitudinal direction of the conveyor 3 and acts via a bevel gear 38 mounted on its output shaft 37 onto the transmission 31.

As can be particularly seen from FIGS. 1 and 2, all links 39 of the bucket chain member 11 run in inclined position on the chain wheel 24. For this purpose, respective chain pockets 40 are provided in the chain wheel 24 for each successive chain link 39. In this manner, each chain link 39 during transition over the chain wheel 24 is engaged in driven manner.

It will be understood that each of the elements described above, or two or more together, may also find a useful application in other types of constructions differing from the types described above.

While the invention has been illustrated and described as embodied in a chain bucket conveyor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A central chain flight conveyor for an underground excavation, comprising a substantially U-shaped forward conveyor part at the side of a sole and open toward a roof; a return conveyor part at the side of backfilling and closed in a substantially channel-like manner, said return conveyor part being normal to said forward conveyor part; an endless chain movable in said conveyor parts and including a flight chain member and a plurality of flights mounted thereon so that said chain member extends centrally of said flights and said flights move in one of said conveyor parts in a substantially horizontal position and in the other of said conveyor parts in a substantially vertical position; means for transporting said chain from one to the other of said conveyor parts with turning of said flights from one to the other of said positions and including actuating stations, a rotary chain wheel having chain pockets and arranged at said actuating stations rotatable about an inclined axis which ascends toward the roof and backfilling and is located in a vertical plane transverse to the longitudinal direction of the conveyor, and a conical surface narrowing toward the roof and having an axis coinciding with the axis of rotation of said chain wheel.

2. A conveyor as defined in claim 1, wherein the axis of rotation of said chain wheel extends at an angle "α" equal to substantially between 45° and 60° to the sole.

3. A conveyor as defined in claim 1, wherein said surface extends at an angle "β" equal to substantially between 30° and 45° to said axis of rotation of said chain wheel.

4. A conveyor as defined in claim 1; and further comprising a reversing drum rotatable about said axis of said chain wheel and formed so that said chain wheel and said surface are components of said reversing drum.

5. A conveyor as defined in claim 1, wherein said surface is formed as a fixed component of said actuating stations and has a recess, said chain wheel being guided in said recess.

6. A conveyor as defined in claim 1; and further comprising a rim element releasably mounted on said chain wheel, said chain pockets being provided in said rim element.

7. A conveyor as defined in claim 1, wherein said flight chain member has a plurality of chain links engaging into said chain pockets in inclined position in shape-locking manner.

8. A conveyor as defined in claim 1, wherein said chain wheel has a chain wheel shaft having an end portion which faces toward the sole and is driven; and further comprising means for driving said end portion of said chain wheel shaft.

9. A conveyor as defined in claim 8, wherein each of said actuating stations has a gibbet, said chain wheel shaft having another end portion facing toward the roof and movable in said gibbet.

10. A conveyor as defined in claim 1, wherein said flights have end sections, said surface having guiding rims located at its both sides and arranged for said end sections of said flights.

11. A conveyor as defined in claim 1; and further comprising an intermediate part connected with said flight chain member, said end sections of said flights being arranged hingeable to said intermediate part.

12. A conveyor as defined in claim 11, wherein said end sections are hingeable in a vertical longitudinal plane of said buckets.

13. A conveyor as defined in claim 10; and further comprising means for limiting swinging of said end sections of said flights.

14. A conveyor as defined in claim 1, wherein said flights are bridge-shaped.

15. A conveyor as defined in claim 1, wherein said actuating stations are formed as drive stations.

16. A conveyor as defined in claim 1, wherein said actuating stations are formed as reverse stations.

17. A conveyor as defined in claim 1, wherein said actuating stations are formed as drive and reversing stations.

* * * * *